United States Patent [19]

Yamashita et al.

[11] Patent Number: 4,504,543
[45] Date of Patent: Mar. 12, 1985

[54] FRICTION MATERIAL

[75] Inventors: Fumitoshi Yamashita, Kyoto; Tomiaki Sakano, Hirakata, both of Japan

[73] Assignee: Matsushita Electric Industrial Co., Ltd., Japan

[21] Appl. No.: 515,932

[22] Filed: Jul. 20, 1983

[30] Foreign Application Priority Data

Jul. 22, 1982 [JP] Japan .................. 57-128771
Jul. 22, 1982 [JP] Japan .................. 57-128772
Sep. 27, 1982 [JP] Japan .................. 57-166519

[51] Int. Cl.³ ............................................. B32B 9/00
[52] U.S. Cl. ................................ 428/338; 192/107 M; 192/113 B; 264/122; 428/455
[58] Field of Search ............... 264/122; 428/326, 338, 428/313.3, 313.5, 321.5, 402, 327, 407, 455, 456; 523/149, 155, 156, 218, 219, 223; 524/16; 192/107 M, 113 B

[56] References Cited

U.S. PATENT DOCUMENTS

| | | | |
|---|---|---|---|
| 3,016,119 | 1/1962 | Rosenberger et al. | 192/113 R |
| 3,037,897 | 6/1962 | Pelley | 156/78 |
| 3,073,424 | 1/1963 | Russell | 192/113 B |
| 3,231,058 | 1/1966 | Batchelor et al. | 192/107 R |
| 3,472,675 | 10/1969 | Gordon et al. | 521/76 |
| 3,777,864 | 12/1973 | Marti | 192/113 A |
| 4,006,809 | 2/1977 | Seino et al. | 192/113 R |
| 4,204,899 | 5/1980 | Walker et al. | 524/16 |

Primary Examiner—William J. Van Balen
Attorney, Agent, or Firm—Wenderoth, Lind & Ponack

[57] ABSTRACT

This disclosure is directed to a friction material which includes a porous material and capsules containing a hydrophobic substance in a liquid form. The porous material and capsules are formed into a composite structure by a binding agent so as to use the hydrophobic substance contained in the capsules for a component of a lubricating layer to be formed on the friction material upon breakage of the capsules.

9 Claims, 5 Drawing Figures

FRICTION MATERIAL

BACKGROUND OF THE INVENTION

The present invention generally relates to a friction material and more particularly, to an improved friction material which may be applied to a clutch lining and a brake lining of an electromagnetic clutch/brake, etc. for use, for example, in an industrial sewing machine and the like.

In the first place, constructions of an electric motor equipped with an electromagnetic clutch/brake, in which a conventional friction material is employed and to which a friction material according to the present invention may be applied, will be described hereinbelow with reference to FIG. 1.

Figure 1:
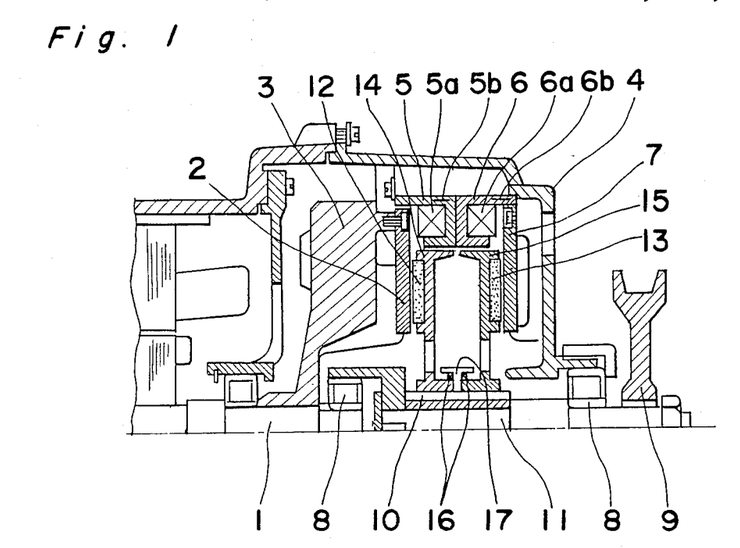
FIG. 1 is a fragmentary side sectional view of an essential portion of an electric motor equipped with an electromagnetic clutch/brake, to which a friction material according to the present invention may be applied (already referred to)

In FIG. 1, the electric motor equipped with the electromagnetic clutch/brake includes an inertia member or fly wheel 3 which is fixedly mounted on one end of a rotary shaft 1 of the driving motor, and to which a clutch plate 2 is secured as one of the constituents of the clutch. In a position confronting the fly wheel 3, there is provided an end bracket 4 which supports a clutch yoke 5 having a clutch winding 5a, a brake yoke 6 having a brake winding 6a and a brake shoe 7, and which has a pulley 9 for deriving output through bearings 8, while a clutch shaft 11 including a sliding shaft 10 (spline shaft) is supported at the other end thereof as shown. On the sliding shaft 10, a clutch ring 14 and a brake ring 15 respectively supporting a clutch lining 12 (friction material) and a brake lining 13 (friction material) are mounted so as to be movable in the axial direction of the sliding shaft 10, but to be prevented from relative movement in the rotating direction thereof, with said clutch ring 14 and brake ring 15 being coupled to each other through an O-ring 16 and a coupling 17.

Subsequently, functions of the electromagnetic clutch/brake having the constructions as described above will be explained hereinbelow.

During the continuous rotation of the rotary shaft 1, rotating energy is accumulated by the fly wheel 3 fixed at the end portion of the rotary shaft 1. Accordingly, upon energization of the clutch winding 5a, electromagnetic force is produced thereby as at 5b, and the clutch ring 14 is attracted to the clutch plate 2, whereby a rotational force is derived from the pulley 9 through the sliding shaft 10 and the clutch shaft 11 via the clutch lining 12 (friction material). For shutting down, upon energization of the brake winding 6a, electromagnetic force is produced as at 6b, and the brake ring 15 is attracted to the brake shoe 7, whereby a braking force is produced with respect to said brake shoe 7 fixed to the end bracket 4 through the brake lining 13 (friction material) via the sliding shaft 10 and the clutch shaft 11 for application of the braking.

The electric motor equipped with the electromagnetic clutch/brake having the constructions as described so far, has been widely employed for driving industrial sewing machines and the like which are generally subjected to starting and stopping very frequently, with the electric motor having a rating of approximately 400 W, and under such conditions for use, the temperature at the surface of the friction material is generally raised up to about 80° C. In the above case, undesirable creaking or squeaking noise tends to be produced during functioning of the friction material in the known friction materials to be employed in the ordinary clutch/brake arrangements. Moreover, since the electric motor equipped with the electromagnetic clutch/brake as described above for driving the industrial sewing machines is normally subjected to the clutching and braking functions in the order of 10,000 times or thereabout per day, the friction material to be employed therefore is required to have a long life sufficient to withstand such repeated operations.

In order to satisfy the requirements as described above, there have conventionally been proposed, for example, in U.S. Pat. Nos. 3,016,119, 3,073,424 and 3,231,058, friction materials for use in electric motors equipped with electromagnetic clutches and brakes, which employ soft porous materials such as compressed cork, baked cork or the like, prepared by mixing particles of cork (obtained by crushing a dried cork tissue of a bark in a soft cell structure) with a particle binding agent such as phenol resin, polyurethane resin, urea resin, polyvinyl acetate resin or the like for subsequent heating and compression. For a mating material corresponding to such friction materials, a carbon steel highly ground or polished is normally employed.

The reason for adopting the soft porous material such as cork for the friction material is such that in spite of the fact that it is a product from a natural plant, for example, cork is chemically stable with respect to fats and oils, organic soaps, alkali, salts, etc. and simultaneously, provides a sufficient resistance against heat as a friction material for the electromagnetic clutch/brake, having a temperature on its frictional surface up to approximately 80° C., without any generation of offensive smell, even by the action of the chemical substances as described above. Furthermore, cork is fundamentally provided with favorable properties such as softness, with a large porosity and a sufficient damping characteristic (tan delta), owing to minute air filled cell structure at a density of approximately 260,000 cells per 1 $cm^3$, and is suitable as a material capable of reducing or suppressing the undesirable creaking or squeaking noise during application of the clutch and brake, besides its superior friction characteristic.

On the contrary, with respect to friction characteristic of the soft porous material such as cork and the like, the coefficient of friction thereof generally tends to be varied due to external factors such as temperatures, sliding speeds, etc., unless there exists a lubrication film or layer on the frictional surface, thus making the clutching and braking functions unstable. Meanwhile, in the soft porous material such as cork or the like having high coefficients of friction in general, coefficient of static friction is high as compared with coefficient of dynamic friction, and therefore, undesirable sticking and slipping phenomena are apt to take place especially in a region of low sliding speeds, with a large variation in the coefficient of friction due to temperatures, thus resulting in such a disadvantage that the undesirable creaking or squeaking noise tends to be produced during functioning of the clutch and brake. Moreover, since the soft porous material such as cork is inferior in heat dissipation, frictional heat during functioning of the clutch and brake is readily accumulated on its frictional surface, and consequently, abnormal abrasions such as transfer of part of the cork onto the mating material or falling off of part of the cork, etc. may take place. As described so far, in the case where the soft porous material such as cork is subjected to friction directly with respect to the mating material without any intervening lubrication layer, there may arise such problems that the creaking or squeaking noise is generated during application of the clutch and brake or life of the friction material is reduced due to acceleration of abrasion to an extremely large extent.

Accordingly, when a soft porous material such as cork is employed for the friction material, it is essential that the frictional characteristics thereof are improved by forming a lubrication layer on the frictional surface.

For the formation of such lubrication layer, it is effective to impregnate cork with oil or grease as in the friction material disclosed, for example, in U.S. Pat. No. 3,777,864. In the arrangement as described above, it is possible to achieve coefficient of friction particularly stable with respect to external factors such as temperatures, surface pressures, sliding speeds, etc. by the effect of the lubrication layer, and moreover, to obtain the desired coefficient of friction over a wide range by adjusting viscosity of the oily agent forming the lubrication layer. Therefore, as long as the lubrication layer is present on the frictional surface to effect the intended function, transmission of torque during functionings of the clutch and brake is stabilized, with the generation of creaking or squeaking noise being advantageously suppressed.

For the prolonged life of the friction material, which is the outstanding problem in the electric motor equipped with the electromagnetic clutch/brake as described so far, it is necessary that the lubrication layer continuously displays its intended function over a long period.

On the other hand, the friction material as described in the foregoing is generally mounted in the actual motor in the form of an electromagnetic clutch or brake movable plate integrally formed with the clutch ring or brake ring by bonding. More specifically, the movable plates for the electromagnetic clutch and brake which employ the friction material prepared by impregnating a soft porous material such as cork with oil or grease, have conventionally been produced generally by two methods as described below.

In the first method, the friction material prepared by shaping a mixture of cork particles and a binding agent into a desired configuration through heating and compression, is secured to the clutch ring or brake ring by an adhesive, and thereafter, oil or grease is applied onto one frictional surface of the friction material thus fixed.

Meanwhile, in the second method, the friction material prepared by shaping a mixture of cork particles and a binding agent into a required configuration through heating and compression, is, for example, directly impregnated with oil or grease so as to keep at least the cork particles in a state wet with the oil, and the friction material thus treated is fixed onto the clutch ring or brake ring, for example, by an oily adhesive.

However, the conventional practices as described above have such disadvantages that, in the first method, oil or grease can not be uniformly penetrated in a large amount into the friction material, while in the second method, it is difficult to achieve a sufficient adhesion, since the friction material preliminarily impregnated with oil or grease must be bonded to the clutch ring or brake ring, with a consequent low reliability.

Furthermore, for impregnating the soft porous material such as cork or the like with oil or grease as described above, it has been a common practice to apply oil or grease onto the material, or immerse or dip the material in oil or grease, with a simultaneous employment of external physical means such as heating, pressurization, pressure reduction, vibration, etc. However, since cork itself, for example, has a resinous substance, together with the air-filled cell structure as is known in its application to waterproof materials, cork stoppers, etc. it is difficult to cause the cells thereof to be fully impregnated with oil or grease, and such oil or grease is normally penetrated between particles of cork. Therefore, uniform impregnation of the friction material with a large amount of oil or grease is not readily effected in either of the above practices.

The amount of oil impregnated and uniformity thereof as described above, however, are essential factors governing the quality and performance of the friction material, and thus, it has been required to provide a technique which is capable of achieving a long life of the friction material through maintenance of a proper amount of impregnation and uniformity of oil or grease, and simultaneously achieving a reliable adhesion of the friction material with respect to the clutch ring or brake ring.

SUMMARY OF THE INVENTION

Accordingly, an essential object of the present invention is to provide an improved friction material prepared by impregnating a soft porous material such as cork or the like, with oil or grease for use, for example, in an electromagnetic clutch/brake, in which the amount of oil or grease to be impregnated into the porous material and uniformity thereof are properly maintained by improved performance and quality of the friction material through extensive research and investigation into the matter.

Another important object of the present invention is to provide an improved friction material of the above described type, which is simple in structure and stable in functioning at high reliability for a long period, and can be readily manufactured on a large scale at low cost.

In accomplishing these and other objects, according to one preferred embodiment of the present invention, there is provided a friction material which includes a porous material and capsules containing a hydrophobic substance in a liquid form. The porous material and capsules are formed into a composite structure by a binding agent so as to use the hydrophobic substance contained in the capsules for a component of a lubricating layer to be formed on the friction material upon breakage of the capsules.

By the construction according to the present invention as described above, an improved friction material has been advantageously presented, with substantial elimination of disadvantages inherent in the conventional friction materials of this kind.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals through the accompanying drawings.

In the first place, it should be noted that the present invention provides a friction material prepared by forming a soft porous material such as cork particles or the like and capsules containing a hydrophobic substance in a liquid form, into a composite structure through employment of a binding agent, and more particularly, a friction material in which shells of the capsules are made of a thermoplastic resin which may be re-softened by heat so that a lubrication layer may be formed on the frictional surface by the hydrophobic substance contained in the capsules upon breakage of at least part of said capsules.

The soft porous material which may be employed as a base material for the friction material according to the present invention includes cork particles obtained by crushing or grinding a dried cork tissue of a bark, particles of coconut shells, organic fibers, etc. which may be formed into a composite structure together with the capsules during shaping, and as the binding agent for the formation of the composite structure as described above, there may be employed heat polymerizing resins such as phenol resin, polyurethane resin, urea resin, polyvinyl acetate resin, etc. which are widely employed in general as binding agents for compressed cork, baked cork, or non-woven fabrics, mats, etc.

Meanwhile, the capsules to be used in the present invention may be those which employ for the shells thereof, thermoplastic resins capable of being re-softened by heat and having a layer forming property, such as polystyrene, polyvinylidene chloride-acrylonitrile copolymer, methyl methacrylate acrylonitrile copolymer, etc., and for the contents to be accommodated within the shells, natural or synthetic hydrophobic substances in the liquid form such as mineral oils, alpha-olefin and copolymers thereof, polyalkylene glycol, polyglycol, polyalkylene oxide, dibasic esters, hindered esters, etc. It should be noted here that the capsules may be in any configuration such as single nucleated spherical capsules, multi-nucleated capsules, multinucleated cluster capsules, dual capsules, capsule clusters, etc. Furthermore, various additives may be added, depending on necessity, to the hydrophobic substances in the liquid form which are used for the contents of the capsules.

For the additives referred to above, there may be employed oily agents of long-chain compounds having polar groups, for example, higher alcohol, ketone, ester, amine, or higher fatty acids, metallic soaps, fats and oils, etc., anti-foamers such as polymethyl siloxane, rust preventing agents which are organic compounds having polar groups such as sulfonate, amine, organic acids or salts, esters thereof, water repellent agents such as organic silicone compounds, higher aliphatic amine, etc., adhesives such as polyisobutylene, polymethacrylate, aluminum soaps of unsaturated aliphatic acid, etc., and also bleeding preventing agents such as free aliphatic acid glyceride, alkaline earth salts of naphthenic acids, lithium salts, zinc soap, petrolatum, etc.

Although the lubrication layer or film to be formed on the frictional surface of the friction material having the construction as described above may be directly formed by the hydrophobic substance in the liquid form flowing out of the capsules due to breakage thereof, an oily agent having compatibility with respect to at least the hydrophobic substance contained in the capsules may further be simultaneously employed. Such oily agent may be directly applied onto the frictional surface, or made into a greaselike substance through addition of a thickening agent thereto for an increased adhesion of the lubrication layer, or further, added with solid lubricants such as graphite, molybdenum disulfide, polytetrafluoroethylene, etc. depending on the need to increase the thickness of the resultant lubricating layer.

As is seen from the foregoing description, in the case where, for example, cork particles, binding agent and capsules are employed as the constituents of the friction material, as long as the shaping is effected after a sufficient mixing of such constituents, with the mixing rate thereof held constant, it is possible to obtain a superior friction material uniformly containing therein a large amount of the hydrophobic substance in the liquid form for the formation of the lubricating layer. Moreover, if the heat polymerizing temperature of the binding agent for the shaping of the respective mixed constituents is set to be lower than the softening temperature of the capsules, the hydrophobic substance in the liquid form remains in the capsules, even after the shaping of the friction material, and thus, it is also possible to mount the friction material onto the clutch ring or brake ring in the above state to constitute the electromagnetic clutch/brake movable plates.

It should be noted here that, although the capsules included in the friction material thus prepared may be readily broken through application thereto of heat exceeding the softening temperature of the shells of the capsules or pressures sufficient to crush such shells, in the case where frictional heat higher in temperatures than the softening temperatures of the thermoplastic resin forming the shells of the capsules is to be generated during use, the capsules may be successively broken by the frictional heat during functioning of the clutch/brake so as to form the lubricating film on the frictional surface thereof.

Hereinbelow, the present invention will be described more in detail with reference to Examples, which are inserted for the purpose of illustrating the present invention, without any intention of limiting the scope thereof.

Effects in the frictional characteristics

The frictional characteristics to be described hereinbelow are based on JIS (Japanese Industrial Standards) D 4411, and obtained under the conditions at 2 m/sec. in a sliding speed, and at 1.8 kgf/cm$^2$ in the face pressure of the friction material, with respect to a mating material in the form of a disc made of carbon steel ground to have a surface roughness of 3 S.

Figure 2:
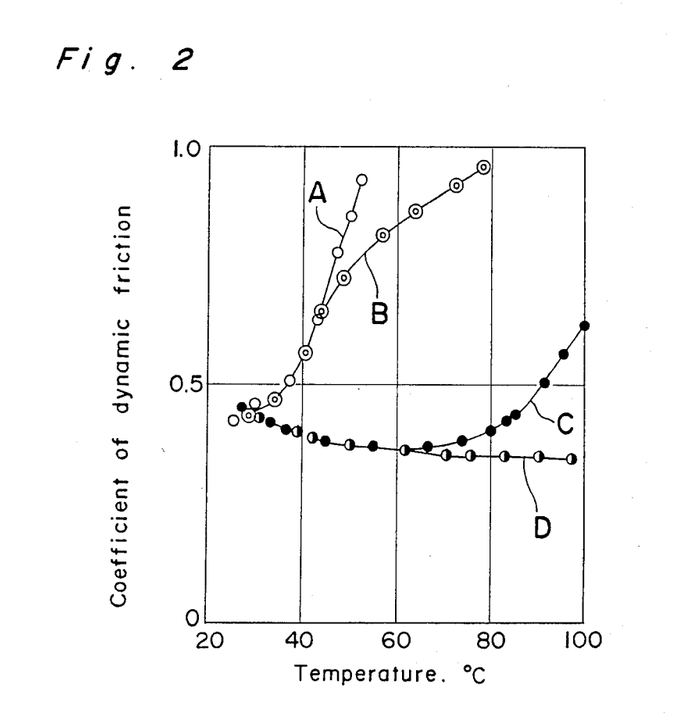
FIG. 2 is a characteristic diagram showing the relation between temperatures and coefficients of dynamic friction.

In a characteristic diagram of FIG. 2 showing the relation between temperatures on the frictional surface of the friction material and sliding speeds, a characteristic curve A represents a compressed cork with an apparent density of about 0.5 g/cc prepared by mixing cork particles of 14 to 35 meshes with a binding agent of polyurethane resin for subsequent heating and compression at 60° C. (the content of the binding agent is about 20 wt.%), a characteristic curve B denotes a baked cork prepared by heating and compressing the same cork particles and binding agent as in the curve A, at 170° C. to achieve an apparent density of approximately 0.6 g/cc, a characteristic curve C shows a friction material prepared by impregnating the compressed cork in the curve A with alpha-olefin having a dynamic viscosity of 28 cst at 40° C. by 22 wt.%, and a characteristic curve D represents the friction material according to the present invention which is prepared by heating and compressing the mixture of 100 parts by weight of cork particles and binding agent similar to those for the curve A, with 30 parts by weight of capsules, with a subsequent application of alpha-olefin similar to that used in the curve C onto the frictional surface of the friction material to form a lubricating layer thereon. The capsules for the curve D employ polyvinylidene acrylonitrile copolymer for the shells thereof, and alpha-olefin similar to that for the curve C as the hydrophobic material in the liquid form container therein, and are in the form of single nucleated spherical capsules with an average particle diameter of 15 microns.

In the characteristic diagram of FIG. 2, it is seen from the curves A and B that, in the case where the cork materials such as the compressed cork, baked cork, etc. are used as they are for the friction material, variation in the coefficient of dynamic friction due to temperatures tend to be large, with high values for the coefficient of dynamic friction. In the above case, even when, for example, phenol resin is employed as the binding agent of the cork particles or particle diameter of the cork particles is altered, the characteristics in the coefficient of dynamic friction with respect to the temperature of the friction disc are generally in the similar trend. Meanwhile, with respect to the curve C which corresponds to the friction material disclosed, for example, in U.S. Pat. No. 3,777,864, and prepared by impregnating cork with oil or grease, the rate of variation in the coefficient of dynamic friction is reduced as compared with the case where the cork materials are used as they are as in the curves A and B, by forming the lubrication layer on the frictional surface by the oil or grease as described above. In the characteristic curve C, although the reduction in the coefficient of dynamic friction with the rise of the friction disc temperature, reflects lowering in viscosity of alpha-olefin which forms the lubrication layer, the coefficient of dynamic friction starts to increase again when the friction disc temperature exceeds about 70° C. This is attributable to the fact that the function of the lubricating layer is gradually lost, since alpha-olefin forming the lubrication layer is volatilized due to influence by frictional heat, etc.

On the contrary, in the case of the curve D related to the present invention, although overlapping the curve C in the comparatively low temperature region, the curve D is clearly differentiated from the curve C when the temperature of the frictional disc exceeds about 70° C. More specifically, in the case of the curve D, the coefficient of dynamic friction is not increased even when the friction disc temperature exceeds 70° C., and rather shows a decreasing trend by reflecting the lowering in the viscosity of alpha-olefin which forms the lubricating film. The phenomenon as described above may be explained such that, even when alpha-olefin forming the lubricating film is volatilized by the effect of frictional heat, etc., the shells of the capsules located in the vicinity of the frictional surface are re-softened by the face pressure or frictional heat according to the above state, and thus, alpha-olefin which is the content of the capsules flows out of the capsules so as to maintain the function of the lubrication layer. In other words, it is clear that, according to the friction material of the present invention, it is possible to cope with clutching and braking functions which are severer than those in the conventional friction material.

Figure 3:
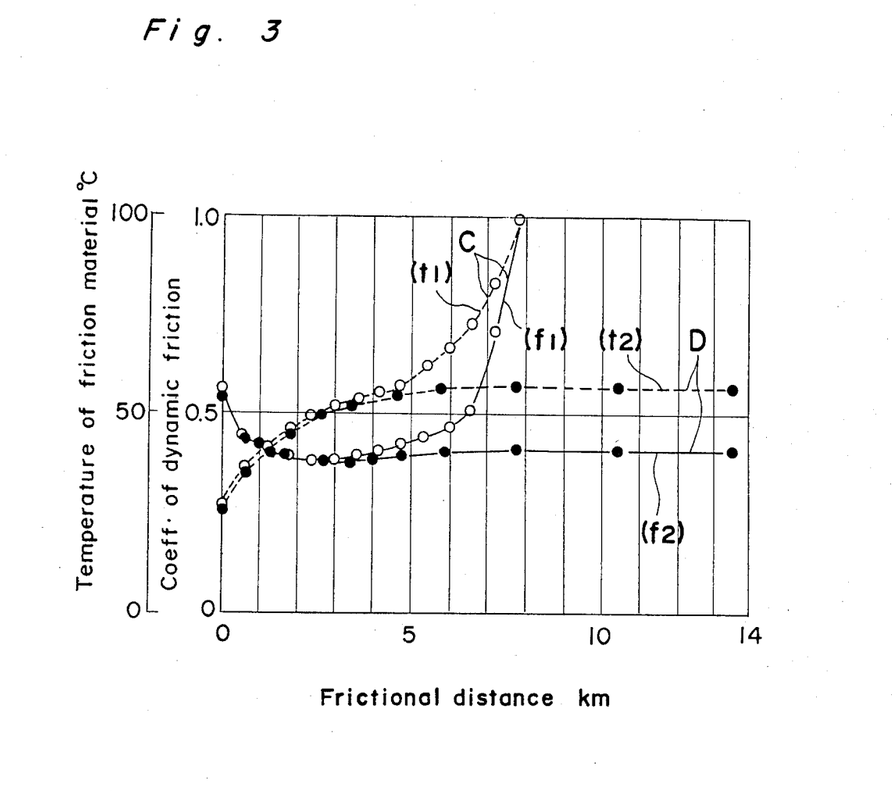
FIG. 3 is a characteristic diagram showing the relation between coefficients of dynamic friction and frictional distances.

In FIG. 3, there is shown a characteristic diagram which shows the coefficients of dynamic friction and temperatures at the central portion of the friction material (5 mm in thickness) with respect to the frictional distance in km in the case where the materials for C and D are employed as the friction materials, in which dotted line curves (t1) and (t2) represent temperature, while solid line curves (f1) and (f2) show coefficient of dynamic friction.

In the characteristic diagram of FIG. 3, the coefficient of dynamic friction for C is reduced at an initial stage as the temperature rises, but again, starts rising thereafter, with a sharp rise at approximately 6.5 km or thereabout in the frictional distance, while the temperature at the central portion of the friction material also rises in correspondence with the sharp increase in the coefficient of dynamic friction. In the above case, although the lubricating layer on the frictional surface had already disappeared, it was found, upon cutting off the frictional material, that alpha-olefin penetrating the cork particles within the friction material remained as it was (the amount of alpha-olefin is at about 22 wt.% which is almost the same before and after the experiment).

With respect to the above friction material C, in the friction material D according to the present invention, although the coefficient of dynamic friction is lowered at the initial stage in the similar manner as in the friction material C, it does not rapidly increase again as in C.

As is seen from the foregoing description, according to the present invention, it is so arranged that the capsules containing the hydrophobic substance in the liquid form within the shells thereof which may be re-softened by heat or pressure, are dispersed in the soft porous material such as cork, thereby to continuously maintain and display the function of the lubrication layer of the frictional surface.

Effects with respect to oil impregnation amount and uniformity thereof

EXAMPLE 1 (capsules broken)

100 parts by weight of cork particles in 14 to 35 meshes, 80 parts by weight of phenol resin (non-volatile component 50 wt.%), and 60 parts by weight of capsules each containing a hydrophobic substance (80 wt.% of alpha-olefin having dynamic viscosity of 28 cst at 40° C.) were mixed together and subjected to heating and compression within a metallic mold at 130° C.±10 degrees for 90 minutes. In this case, the shells of the capsules were made of methyl methacrylate acrylonitrile copolymer having a softening temperature of about 100° C., and formed into single nucleated spherical capsules with an average particle diameter of 15 microns.

The material thus heated and compressed within the metallic mold was taken out of the metallic mold so as to obtain a shaped friction material (dimensions: 200 mm×200 mm×50 mm), while causing the material to contain oil at an apparent density of about 0.6 g/cc.

EXAMPLE 2 (capsules not broken)

Under the conditions similar to the above Example 1, when the material was heated and compressed at 60° C. through employment of phenol resin having a low polymerizing temperature, there was obtained a friction material in which the capsules were located among the cork particles without being broken.

COMPARATIVE DATA 1 (vacuum impregnation)

100 parts by weight of cork particles in 14 to 35 meshes, and 80 parts by weight of phenol resin (50 wt.% of non-volatile component) were mixed together, and subjected to heating and compression within a metallic mold at 130%±10 degrees for 90 minutes. The material thus heated and compressed was taken out of the metallic mold to obtain compressed cork (dimensions: 200 mm×200 mm×50 mm) having an apparent density of about 0.5 g/cc.

The compressed cork thus prepared was impregnated with alpha-olefin having a dynamic viscosity of 28 cst at 40° C. under the conditions at 80° C. and 1 to 3 mmHg for 8 hours.

COMPARATIVE DATA 2 (heating immersion)

Alpha-olefin similar to that employed in the above Comparative data 1 was heated up to 80° C., and the compressed cork was kept immersed therein for 50 hours.

COMPARATIVE DATA 3 (immersing pressurization)

Alpha-olefin similar to that employed in the comparative data 1 was heated up to 80° C., and the compressed cork was kept immersed therein for 50 hours, while the compressed cork thus treated was further subjected to a procedure for compression and restoration by about 20% two times.

Figure 4:
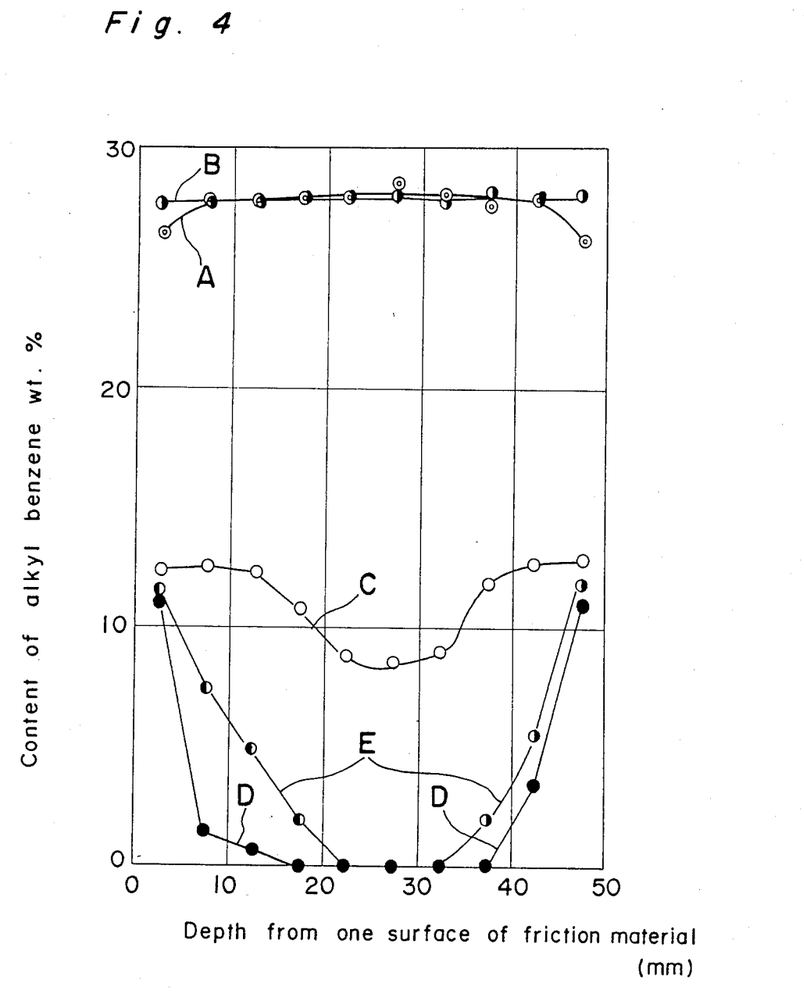
FIG. 4 is a characteristic diagram showing contents of oil with respect to longitudinal sections of the friction material.

As compared with the friction materials of the present invention, the friction materials C to E for the comparative data contain extremely small amounts of alpha-olefin therein as shown in FIG. 4, and moreover, variations of oil contents in the direction of thickness of the friction material are large and uneven.

A is seen from the foregoing description, according to the present invention, it is possible to readily cause a large amount of hydrophobic substance in the liquid form for the lubrication layer formation, to be uniformly present within the friction material.

Effects as applied to electromagnetic clutch/brake movable plates

The friction material (dimensions: 200 mm×200 mm×5 mm ) according to the present invention was further processed into an annular configuration of 15 mm in an outer diameter, 83 mm in an inner diameter and 6 mm in a thickness with the use of a Thomson mold. Subsequently, the friction materials thus processed where bonded to the clutch ring and brake ring through employment of an oily bonding agent so as to constitute electromagnetic clutch/brake movable plates. In the similar manner, electromagnetic clutch/brake movable plates were prepared by friction materials different only in the amount of capsules contained.

Figure 5:
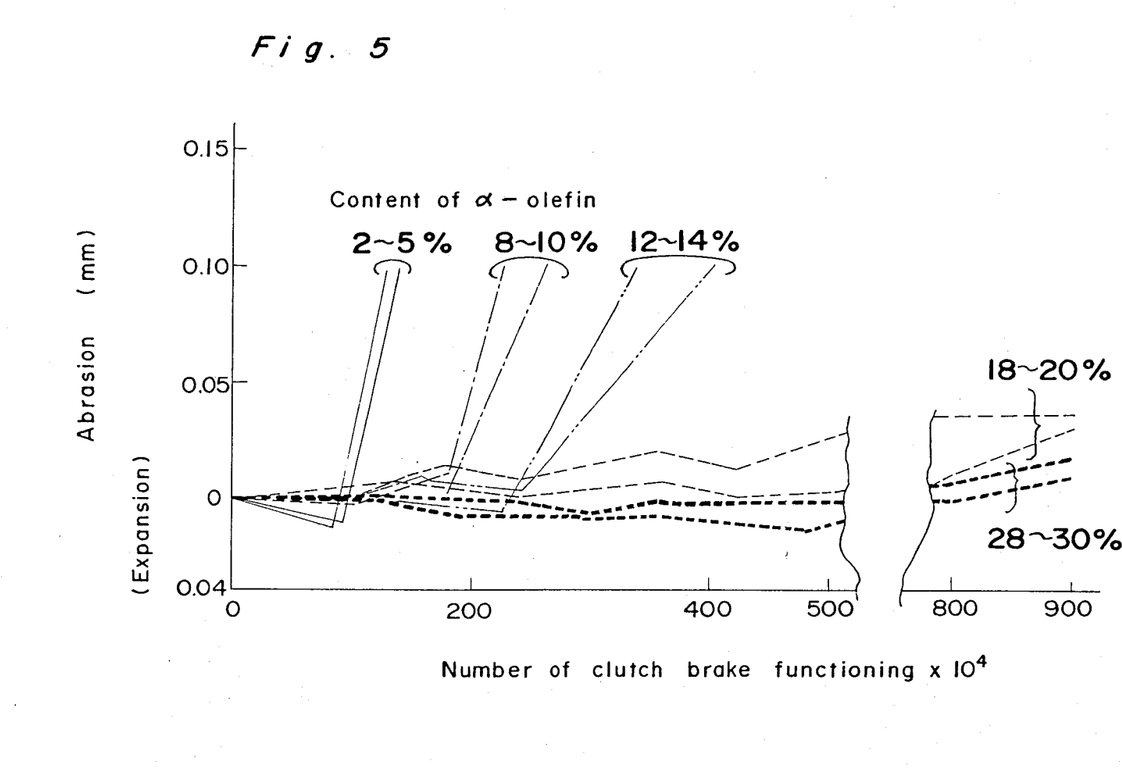
FIG. 5 is a characteristic diagram showing the relation between the number of functionings of the clutch/brake and the amount of abrasion of the friction material, when movable plates, in which the friction material is bonded to the clutch ring and brake ring, are actually mounted on the electric motor equipped with the electromagnetic clutch/brake.

In FIG. 5, there is shown a characteristic diagram showing the relation between the number of functionings of the clutch and brake and the amounts of abrasion of the friction materials, in the case where electromagnetic clutch/brake movable plates to which friction materials different in the amounts of capsules contained therein are bonded, are mounted on the electric motor equipped with the electromagnetic clutch/brake as shown in FIG. 1, with the clutching and braking functions being effected for one second respectively.

From FIG. 5, it is clear that the life of the friction material is prolonged as the capsule content increased, and particularly, when the amount of the hydrophobic substance in the liquid form contained in the capsules exceeds 18 to 20%, the life of the friction material against abrasion may be remarkably improved.

As is clear from the foregoing description, according to the present invention, there is provided an improved friction material which is prepared by forming the soft porous material and the capsules containing the hydrophobic substance in the liquid form, into a composite structure by the binding agent so that the content of the capsules forms the lubrication layer on the frictional surface upon breakage of such capsules. As compared with the conventional friction materials which are prepared by directly impregnating soft porous materials with oil or grease, the friction material according to the present invention may be quite readily attached to the clutch ring and brake ring, for example, without breaking the capsules, with simultaneous achievement of a strong adhesion. Moreover, as compared with the case where oil or grease is directly impregnated, it is possible, in the friction material according to the present invention, to cause a large amount of hydrophobic substance in the liquid form to be uniformly and readily present in the friction material, and thus, coefficient of friction may be continuously stabilized for a long period of time. In other words, according to the present invention, an improved friction material with a long life which does not easily produce the undesirable creaking or squeaking noise may be provided at an extremely high quality and low cost.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A friction material for a clutch or brake which comprises a soft porous material and capsules containing therein a lubrication material comprising a hydrophobic substance in a liquid form, said porous material and said capsules being formed into a composite structure by a binding agent, said lubrication material forming a lubrication layer on said friction material upon breakage of said capsules said lubrication material being present in said capsules in an amount sufficient to provide uniform lubrication upon breakage of said capsules and yet good adhesion of said friction material to a substrate.

2. A friction material as claimed in claim 1, wherein shells of said capsules are made of a thermoplastic resin which can be re-softened by heat.

3. A friction material as claimed in claim 2, wherein said thermoplastic resin is of methyl methacrylate acrylonitrile copolymer having a softening temperature of approximately 100° C.

4. A friction material as claimed in claim 1, wherein said binding agent is of phenol resin.

5. A friction material as claimed in claim 1, wherein said hydrophobic substance in the liquid form which is the content of said capsules is present at least more than 18% by weight in said friction material.

6. A friction material as claimed in claim 1, wherein said porous material is of cork particles.

7. A friction material as claimed in claim 1, wherein said hydrophobic substance is of alpha-olefin having a dynamic viscosity of 28 cst at 40° C.

8. A process of manufacturing a friction material which comprises the steps of mixing 100 parts by weight of cork particles, 80 parts by weight of phenol resin (50 wt% of non-volatile component), and 60 parts by weight of capsules each containing hydrophobic substance in a liquid form, subjecting the mixture thus prepared to heating and compression in a metallic mold at temperatures of 130° C.±10 degrees for 90 minutes, and taking out the mixture thus heated and compressed in the metallic mold out of said metallic mold for subsequent shaping into the friction material in which said capsules are broken.

9. A process of manufacturing a friction material which comprises the steps of mixing 100 parts by weight of cork particles, 80 parts by weight of phenol resin (50 wt% of non-volatile component) having a low polymerizing temperature, and 60 parts by weight of capsules each containing hydrophobic substance in a liquid form, subjecting the mixture thus prepared to heating and compression in a metallic mold at temperatures of 60° C.±10 degrees for 90 minutes, and taking out the mixture thus heated and compressed in the metallic mold out of said metallic mold for subsequent shaping into the friction material in which said capsules are not broken.

* * * * *